(12) United States Patent
Dillenberger et al.

(10) Patent No.: US 6,361,442 B1
(45) Date of Patent: Mar. 26, 2002

(54) REPEATABLE PRESET TORQUING FORCE VISE HANDLE FOR PRODUCING REPEATABLE CLAMPING FORCE IN A VISE

(75) Inventors: Eric Dillenberger, Wolf Creek; Craig Adams, Grants Pass, both of OR (US)

(73) Assignee: ProTech Engineering, Grants Pass, OR (US)

( * ) Notice: Subject to any disclaimer, the term of this patent is extended or adjusted under 35 U.S.C. 154(b) by 0 days.

(21) Appl. No.: 09/487,471

(22) Filed: Jan. 19, 2000

(51) Int. Cl.[7] .................................................. F16D 7/02
(52) U.S. Cl. ............................ 464/30; 269/244; 464/37
(58) Field of Search ............................. 464/30, 37, 38, 464/39

(56) References Cited

U.S. PATENT DOCUMENTS

| | | | | |
|---|---|---|---|---|
| 1,173,316 A | * | 2/1916 | Segal | 464/39 |
| 1,565,754 A | * | 12/1925 | Orth | 464/39 |
| 4,046,364 A | * | 9/1977 | Coope et al. | 269/244 |
| 4,971,301 A | * | 11/1990 | Yang | 269/153 |
| 5,171,004 A | * | 12/1992 | Berchtold | 269/244 |
| 5,192,062 A | * | 3/1993 | Berchtold | 269/244 |
| 5,482,300 A | * | 1/1996 | Wendhack | 279/51 |
| 5,526,715 A | * | 6/1996 | Swann et al. | 74/822 |
| 5,683,077 A | * | 11/1997 | Fink et al. | 269/244 |

* cited by examiner

Primary Examiner—Lynne H. Browne
Assistant Examiner—Aaron Dunwoody
(74) Attorney, Agent, or Firm—Fuess & Davidenas

(57) ABSTRACT

A slender cylindrical torque-limiting handle for a machinist's vise is built along an internal shaft. A drive clutch with a distal end coupling engaging the vise shaft of a vise, and a proximal end presenting a multiple tooth inclined plane, is affixed to the shaft. A pressure clutch, fitted about the shaft, has a distal end multiple tooth inclined plane complimentary to, and mating with, the multiple tooth inclined plane of the drive clutch. A given rotational torque in a one rotational direction applied to the pressure clutch about the shaft will, in accordance with the extent to which the distal end of the pressure clutch is held pressured to the proximal end of the drive clutch, produce a correspondingly associated angular rotation of the drive clutch, tightening the vise until, at a preset torque, the pressure clutch will thereafter slip relative to the drive clutch. An adjustable mechanism based on variably compressed Belleville washers serves to adjustably force the pressure clutch into contact with the drive clutch. A handle graspable by the human hand is rotated so as to impart rotational torque to the mechanism and to the pressure clutch. The maximum torque transmitted to the drive clutch, and the corresponding tightening force developed by the machinist's vise, is a function of the adjustment.

11 Claims, 3 Drawing Sheets

REPEATABLE PRESET TORQUING FORCE VISE HANDLE FOR PRODUCING REPEATABLE CLAMPING FORCE IN A VISE

BACKGROUND OF THE INVENTION

1. Field of the Invention

The present invention generally concerns a handle for a machinist's vise.

The present invention particularly concerns handles or machinist's vises known in the art as "speed" handles and particularly to an economical "speed" handle in which the maximum torque that can be applied to the handle is limited to a preset value so as to limit the clamping force applied by the jaws of the vise to the part being clamped.

2. Description of the Prior Art

The machinist's vise is a well known devise in the machining art for holding a part being machined on the table of a mill as the milling cutter machines the part. The typical machinist's vise is bolted onto the table surface of the mill and has a horizontal screw abutting a jaw of the vise and another end on which a handle is mounted and turned such as to clamp the jaws of the vise on the part. The part must be held very firmly to prevent slippage in the vise which could result in ruining the part. However, in numerous instances, particularly when the part has a thin section, the clamping force of the vise can at least temporarily deform the part resulting in a necessity to make adjustments in machining the part to maintain tolerance.

Variations in clamping force from one part to the next can result in variations of the machining dimensions which are greater than the machining tolerance. These variations in clamping force arise from differences between force applied by different operators or even with one operator such as may arise from fatigue.

A number of modifications of the machinist's vise have been disclosed related to speed opening and closing the vise and applying controlled clamping force.

U.S. Pat. No. 5,192,062 to Berchtold discloses a clamping force adjusting devise for a clamping devise such as a vise which requires a force multiplier attached to a clamping rod.

U.S. Pat. No. 4,738,438 to Horie, et al., discloses a machine vise with a strain gage detector devise enabling the operator to control applied clamping force.

U.S. Pat. No. 4,046,364 discloses a torque limiting devise having a handle portion coupled to the drive screw of the vise through a friction clutch constructed as an integral part of the vise in which frictional force between the clutch disks can be pre adjusted to permit slip when the torque applied to the handle portion exceeds a preset value. The handle is also coupled to the drive screw of the vise by a shrag clutch which is disengaged when the handle is turned in the direction to tighten the vise and is disengaged in the opposite direction so as to provide a positive coupling to retract (loosen) the vise jaws. The construction of the vise requires application of a spanner wrench to adjust the frictional limiting force of the clutch mechanism and the adjustment of the frictional limit force of the clutch mechanism is integral to the base of the vise.

U.S. Pat. No. 5,192,062 for a CLAMPING FORCE ADJUSTING DEVISE FOR A CLAMP DEVISE concerns a clamping force adjusting devise having a hollow housing supported on a movable clamping part of the same, through which housing passes a rotatable and slidable tension rod whose first end can be coupled to a force amplifier and whose second end carries a tension sleeve fixed thereon. The tension sleeve is supported on Belleville springs through a thrust bearing and an intermediate sleeve, the Belleville springs being supported directly in the housing. An adjusting sleeve screws into a fine thread of the housing and has at its end facing the Belleville springs a radially inwardly directed first stop shoulder, which cooperates with a radially outwardly directed second stop shoulder of the intermediate sleeve and/or a spacer ring bearing on the thrust bearing. Belleville springs will be seen to be employed in the preset torquing force vise handle of the present invention.

A prior art patent that is directed to a vise handle fulfilling the same purposes as does the handle of the present invention is U.S. Pat. No. 5,683,077 for a VISE HANDLE WITH TORQUE CONTROL. Indeed, certain of the description regarding the background of vise handles and force-controlled clamping that appears within that patent is within the Description of the Prior Art section of the instant specification. The 5,683,077 patent concerns a handle for a machinists vise configured to preset the maximum clamping force that can be applied to the vise jaws. The handle is constructed such that, in tightening the vise, when a clamping force is applied by the operator to the handle equal to a preset value, a clutching mechanism in the handle will allow the handle to slip without further tightening of the vise. The mechanism includes a ratchet for positive engagement in loosening the vise and for providing a clicking sound that the clutch is slipping and thereby alert the operator that maximum clamping force is being applied.

Accordingly, both the handle of the '077 patent, and the handle of the present invention, have as their objects the provision of a handle attachable to the drive screw of the standard machinist's vise for use in turning the drive screw to apply a preset clamping force on a part. This handle is suitably used with the typical (off the shelf) machinist's vise. The handle can be adjustably preset so as to apply a particular vise to which the handle is currently affixed and used to apply a correspondingly preset clamping force. The handle will elicit a signal to the operator that slipping of the handle is occurring when the torquing force applied to the handle, and the corresponding clamping force of the vise, reaches a preset value.

Further in common with the handle of the '077 patent, it is an object of the handle of the present invention that the operator can preset a value of force with convenience. It is another object that the maximum force applied to the handle of the vise be more closely controlled than the devises of the prior art. It is still yet another object that the invention have a simple and robust construction, and be economical to build.

SUMMARY OF THE INVENTION

The present invention contemplates a compact, effective, reliable and economical torque-limiting handle for a machinist's vise.

The torque-limiting handle is a slender cylinder in form, being built along an internal shaft. The maximum torque that may be transmitted by the torque-limiting handle is determined by rotation of an external sleeve under force of the fingers. This rotation may readily be accomplished under but even, slight, force regardless that the handle is being preset to transmit low, or high, torque. To facilitate the assumption, and holding, of certain preset torque values, the rotational sleeve is preferably possessed of detents and/or markings, making accurate setting of the sleeve, and the torque-limiting handle, both easy and speedy.

When such torque in a one, vise-tightening, rotational direction as is attempted to be transmitted along the torque-limiting handle reaches the preset limit, the torque-limiting handle will thereafter continue to turn, but will slip in the manner of a ratchet between its driven and driving ends. The slipping handle will make such a sound, and will present such diminished pressure to the hand, as will make clear to the user that the preset torque has been reached, and that the torque-limiting handle is ineffective to transmit any greater torque. The preset maximum tightening torque that is transmitted corresponds to a preset maximum clamping force of the machinist's vise upon which the torque-limiting handle is being used.

There are no limits on the torque that can be transmitted when the torque-limiting handle is turned in a second, vise-opening, rotational direction. It is thus always possible to positively apply any necessary torque to open the vise, even if such torque must exceed (in a different rotational sense) the preset torque limit.

Such wear, and metal fatigue, as the parts of the torque-limiting handle are subject to does not obviate their function. Being that the handle is not a calibrated torque wrench, but merely an accessory to a machinists vise that, when matched with and adjusted to a particular vise, permits a predetermined clamping force to be reliably repetitively delivered by the vise, the handle should be usable indefinitely without maintenance. When constructed of quality materials, the handle should perform for many decades, and for many hundreds of thousands of tightening and loosening cycles.

1. A Torque-limiting Handle for a Machinist's Vise

Therefore, in one of its aspects the present invention contemplates a torque-limiting handle for a machinist's vise having a particular, compact and reliable, torque-imparting mechanism. Namely, the torque-limiting handle has a drive clutch with a distal side for engaging a machinist's vise and a proximal side having and presenting a plurality of circumferential teeth with ramp surfaces.

A shaft is affixed to the drive clutch and extends distally therefrom.

A pressure clutch, located about the shaft, has and presents at a distal side a complimentary plurality of circumferential teeth suitable to engage the ramp surfaces of the plurality of teeth of the drive clutch.

A mechanical mechanism serves to force the pressure clutch along the direction of the shaft and into the drive clutch. This forcing is realized at a variably predetermined pressure.

Finally, a coupler of an external torquing force—such as may be and most commonly is provided by the human hand—serves to rotate the pressure clutch.

By this simple structure the drive torque applied to the pressure clutch by the coupler produces a regular repeatable increase in angular displacement of the drive clutch until, a preset torque being reached, the plurality of teeth of the drive clutch will ramp over and snap free of the teeth of the pressure clutch, and no further torquing of the drive clutch can be realized. The jaws of the machinist's vise engaged by the drive clutch can thus be tightened to an adjustably predetermined extent, and no tighter.

The mechanical mechanism serves preferably consists of a number of spring, or Belleville, washers affixed about the shaft at the proximal end thereof. These washers pressure against a main body fitting circumferentially about the shaft so as to place this main body in variably predetermined extension from an adjustment body fitting circumferentially about the shaft and abutting against the pressure clutch. The adjustment of the variably predetermined extension of the main body from the adjustment body, and vice versa, determines how strongly the pressure force of the plurality of spring washers is transmitted to the pressure clutch. The pressure clutch is thus forced into the drive clutch at the variably predetermined pressure.

There may optionally be included detentes between the main body and the adjustment body for holding a variably selected screwed separation therebetween.

The coupler most commonly consists of a handle mount rotationally linked to the pressure clutch, and a handle, graspable by the hand, affixed to the handle mount for imparting rotation thereto. This handle is preferably pivotally affixed to the handle mount.

2. A Mechanism for Engaging the Vise Shaft of a Vise to Impart a Predetermined Torque In another of its aspects, the present invention can be considered to be embodied in a mechanism for engaging the vise shaft of a vise to impart a predetermined torque to the shaft, thereby to develop a correspondingly predetermined force between jaws of the vise.

The preferred mechanism has a drive clutch having (1) a distal end coupling that engages to the vise shaft of a vise and (2) a proximal end multiple tooth inclined plane.

A drive shaft is affixed to the drive clutch and extends proximally therefrom.

A pressure clutch, fitted about the shaft, has a distal end multiple tooth inclined plane complimentary to, and mating with, the multiple tooth inclined plane of the drive clutch. This mating is so that a given rotational torque in a one rotational direction applied to the pressure clutch about the shaft will, in accordance with the extent to which the distal end of the pressure clutch is held pressured to the proximal end of the drive clutch, produce a correspondingly associated angular rotation of the drive clutch. This angular rotation of the drive clutch serves to tighten the vise for a range of applied torques and associated angular rotations until, at a preset torque and a corresponding maximum angular rotation of the drive clutch and a corresponding maximum tightening of the vise, the pressure clutch will thereafter slip relative to the drive clutch.

Meanwhile, rotational torque in an opposite rotational direction applied to the pressure clutch will invariably produce a correspondingly associated angular rotation of the drive clutch as serves to open the vise.

An adjustment mechanism is located proximally of the pressure clutch about the drive shaft, and is rotatably affixed to the pressure clutch. This adjustment mechanism serves to (1) force at a variably predetermined force the pressure clutch into pressured contact with the drive clutch while (2) imparting rotation to the pressure clutch. A handle graspable by the human hand is normally connected, and serves to impart rotation, to the adjustment mechanism.

In detail, the adjustment mechanism preferably consists of three major parts, all arrayed about a central shaft.

1) A generally cylindrical adjustment body is centered about the shaft, with its distal end against a proximal end of the pressure clutch, and with internal screw threads at its proximal end.

2) A generally cylindrical main body, centered about the shaft proximally of the adjustment body, has an extension passing through the adjustment body to rotationally engage the pressure clutch, a distal end shoulder against a proximal end of the adjustment body, distal end external screw threads threadingly engaging the screw threads of the adjustment body, and a proximal end region connecting the handle.

3) A plurality of spring washers are arrayed centered about the shaft distally of the main body. A stop at the proximal end of the shaft holds the plurality of spring washers upon the shaft.

By this construction a threading engagement of the adjustment body and the main body to a variable extent variably compresses the spring washers, transmitting the variable compression force thereof along the axis of the shaft to the pressure clutch, and forcing the pressure clutch into variable compression with the drive clutch.

The adjustment mechanism preferably further includes detents between the adjustment body and the main body tending to hold both bodies at a manually preset rotation angle of threading engagement one body relative to the other. This manually present rotation angle determines the variable compression of the spring washers which, as transmitted along the axis of the shaft to the pressure clutch, forces the pressure clutch into variable compression with the drive clutch.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow.

DESCRIPTION OF THE PREFERRED EMBODIMENT

Although a specific embodiment of the invention will now be described with reference to the drawings, it should be understood that this embodiment is by way of example only and is merely illustrative of but one of the many possible specific embodiments to which the principles of the invention may be applied. Various changes and modifications obvious to one skilled in the art to which the invention pertains are deemed to be within the spirit, scope and contemplation of the invention as further defined in the appended claims.

Figure 1:
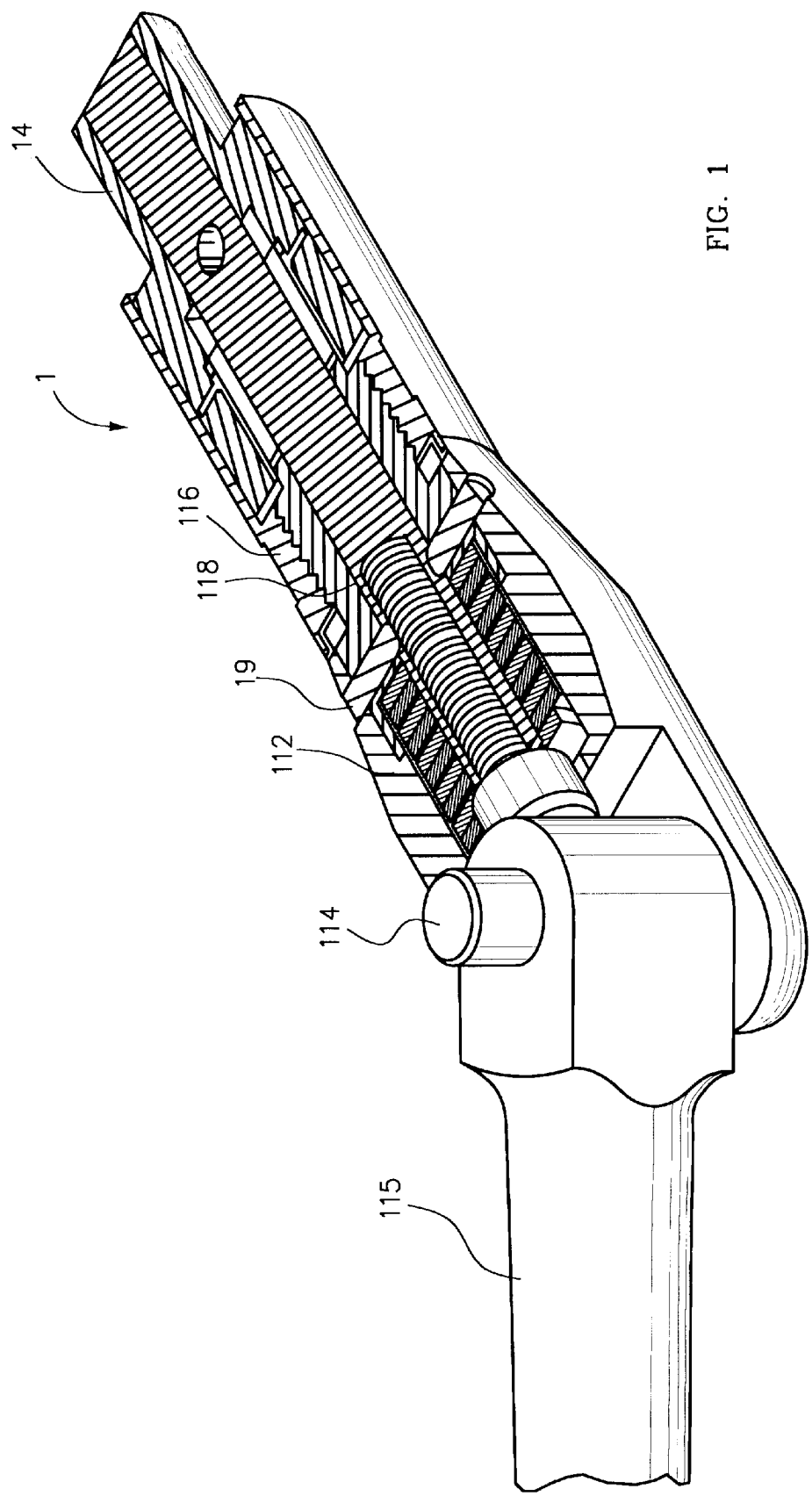
FIG. 1 is a diagrammatic cut-away perspective view of a preferred embodiment of a machinist's vise handle in accordance with the present invention.
Figure 2:
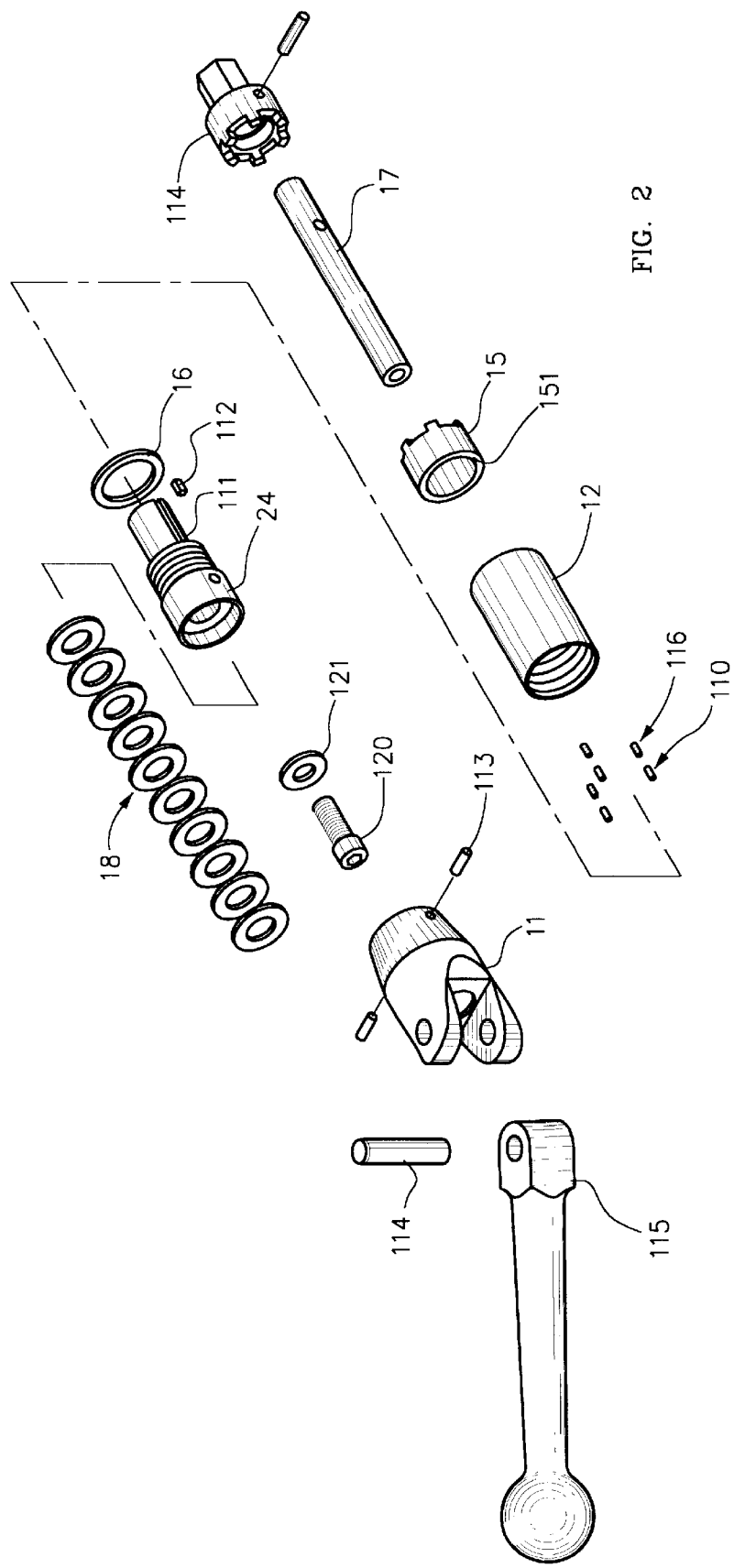
FIG. 2 is a diagrammatic exploded perspective view of the preferred embodiment of a machinist's vise handle in accordance with the present invention previously seen in FIG. 1.
Figure 3:
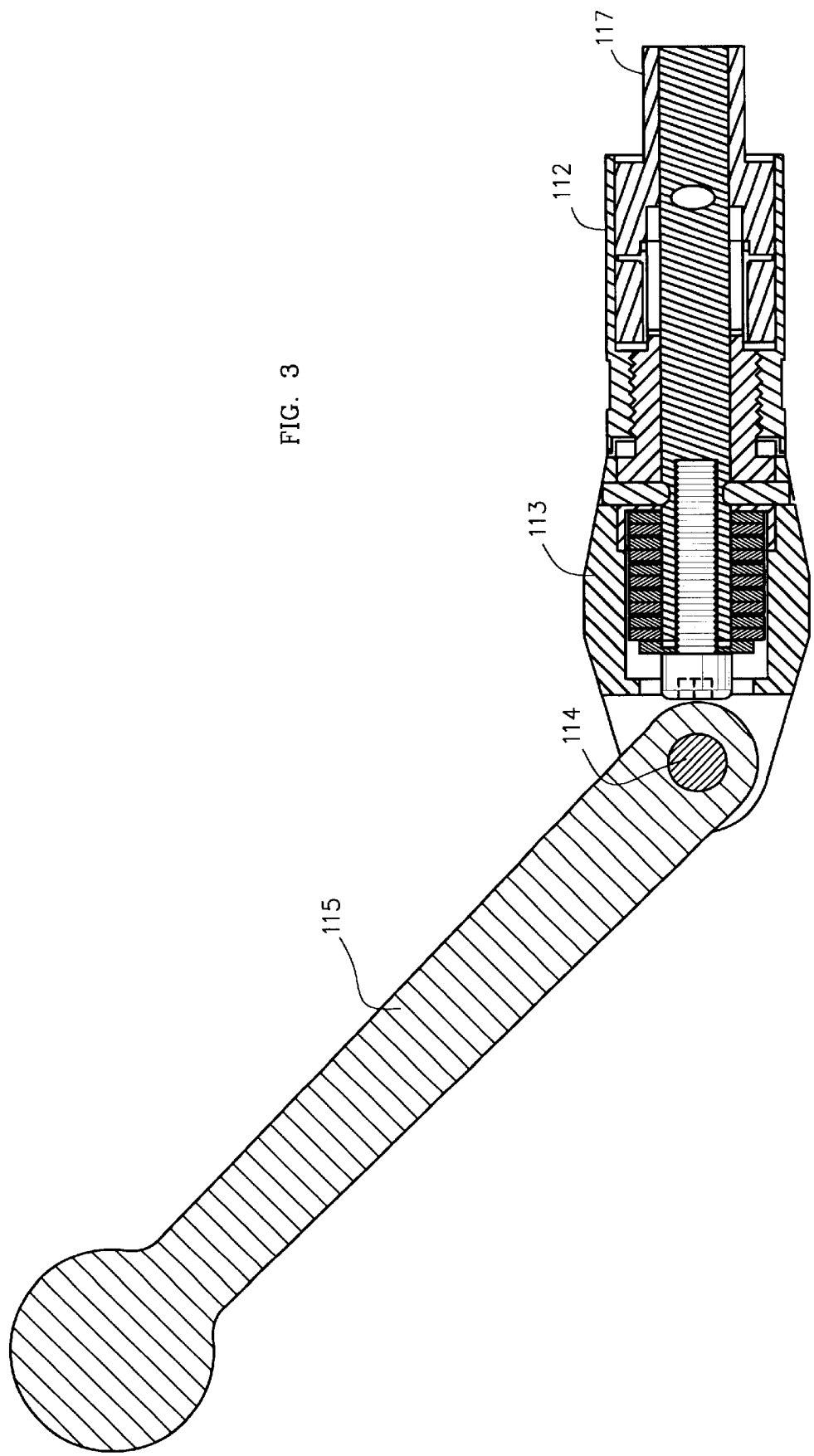
FIG. 3 is a cut-away side plan view of the preferred embodiment of the machinist's vise handle in accordance with the present invention previously seen in FIGS. 1 and 2.

A diagrammatic cut-away perspective view of a preferred embodiment of a machinist's vise handle in accordance with the present invention is shown in FIG. 1. A diagrammatic exploded perspective view of the same preferred embodiment of the machinist's vise handle 1 is shown in FIG. 2. The same machinist's vise handle 1 is shown yet again in cut-away side plan view in FIG. 2.

The major components appearing to the exterior of the vise handle 1 are, as are best seen in FIG. 1 proceeding from the distal to the proximal end of vise handle 1, the drive 14, the adjustment body 12, the handle mount 13, and the handle 115 as secured by the handle pin 114. Other components are to the interior, as illustrated. The primary action of the vise handle 1 to impart a preset torque is realized by a engagement at a selected force of the adjustment body 12 and the drive clutch 14, as is best seen in FIG. 2. Accordingly, close attention to the engagement of these two parts may beneficially be made in the ensuing discussion.

Commencing at the distal end where is engaged the hexagonal drive of a machinist's vise (not shown), the drive clutch 14 has at its distal end a hexagonal drive that mates with this hexagonal drive of a machinist's vise. The drive clutch 14 is so called because it drives the tightening of a machinist's vise (not shown) on which the vise handle 1 is used. In the internal operation of the vise handle 1, the drive clutch 14 will actually be a driven, and not a driving, member.

A main drive shaft 17 is attached to the drive clutch 14 by a main shaft pin 19. A pressure adjustment clutch 15 is placed around the shaft 17 and, while selectively pressure against the drive clutch 14 by means to be explained, caused to rotate by means that will be explained.

Either the drive clutch 14, or the pressure adjustment clutch 15, or both the drive clutch 14 and the pressure adjustment clutch 15 have and present at their opposed mating surfaces a multiple tooth inclined plane. Preferably the drive clutch 14 so has and presents this multiple tooth inclined plane, as is best illustrated in FIG. 2, while the pressure adjustment clutch 15 has multiple teeth of a complimentary, or an even simpler, form, again as is best illustrated in FIG. 2. The rotation of the pressure adjustment clutch 15 (by means to be explained) will produce a regular repeatable increase in angular displacement of the drive clutch 14 for a given applied clockwise rotational torque until, a preset torque being reached, the teeth of the drive clutch 14 will snap free of the teeth of the pressure adjustment clutch 15 (and vice versa), and no further torquing of the drive clutch 14 can be realized.

Clearly the amount of torque that can be transmitted from and between the multiple inclined teeth of the pressure adjustment clutch 15 to the drive clutch 14 is a function of how tightly these two components are held pressured together. This pressure is adjustable, and easily so adjustable, in accordance with the preferred operation of the invention, as next explained. The adjustably preset clockwise torque of rotation results in a commensurate preset clamping force between the jaws of any machinist's vise with which vise handle 1 is used.

Note that application of torque in a counterclockwise rotational direction between the pressure adjustment clutch 15 and the drive clutch 14 causes a mating engagement between the flat sides of the multiple teeth of both clutches, and will cause such positive rotation as will loosen the jaws of a machinist's vise on which the vise handle 1 is used.

Continuing in the Figures, a main body 11 located at the proximal side of the pressure adjustment clutch 15 in a position radially about an axis of the shaft 17 engages the pressure adjustment clutch 15 for positive rotation therewith, normally by action of a complimentary slot 111 and square key 112. There is a slot 151, complimentary to the square key 112, in the interior annulus of the pressure adjustment clutch 15. The main body 11 and the adjustment clutch 15 thus rotate together about the shaft 17.

The main body 11 is, however, adjustable in its proximal extension from the pressure adjustment clutch 15. In the region of this adjustable extension, and radially to the exterior of main body 11 at the surface of the vise handle 1, a detente ring 16 engages through a detente springs 116 and detente pins 110 (normally three each in number) an adjustment body 12. The adjustment body 12 is threaded to its interior, and the main body 11 is threaded to its exterior. The adjustment body 12 threadingly engages the main body 11 variable relative rotation, and separation, until all (nominally three) detente pins 110 lodge into recesses upon the detente ring 16 under the force of (the associated three) springs 116.

Proximally from the main body 11, and in position about the shaft 17, are a number of spring washers 18, preferably about ten in number of the Belleville type. The spring washers 18 are held on the shaft 17 by a main shaft bolt 120, and a main shaft washer 121, that screws into the proximal end of the shaft 17. These spring washers 18 make such frictional contact with the main body 11 as varies dependent upon how far the main body 11 is extended towards the proximal end of the shaft 17, compressing the several spring washers and causing a progressive interlocking of their contour features. The amount of this extension of the main body 11 along the shaft 17 is determined, of course, by the threaded adjustment of the adjustment body 12 relative to the main body 11.

Meanwhile, a handle mount 13 affixes the main body 11, preferably by assembly pins 113 that are more preferably two in number. The handle mount 13 is itself affixed to a handle 115, and is preferably so affixed by a handle pin 114 so that the handle 115 may pivot relative to the handle mount 13, and relative to the entire major axis of the vise handle 1 and its major components.

During operation of the vise handle, the adjustment body 12 is turned, normally under force of the fingers against its exterior knurled surface, to an adjustable extension from the main body 11. This extension will, as previously mentioned, affect the compression of the multiple spring washers 18, and the amount to which the adjustment body 12 is forced against the pressure adjustment clutch 15 against the drive clutch 14 along the length of the shaft 17.

When the handle mount 13 is forced to rotate under hand force applied to handle 115 then the main body 11 will likewise rotate, yet still further likewise rotating the pressure adjustment clutch 15. When the rotation of the pressure adjustment clutch 15 is clockwise as viewed from the proximal end of the vise handle 1, then its multiple teeth will engage, under preset compressive force, the inclined planes of the multiple teeth of the drive clutch 14. This will cause the drive clutch 14 to rotate until a predetermined torque is exceeded, thus tightening the jaws of a machinist vise (not shown) to which the drive clutch 14 is mated to a variably predetermined tightness. Alternative rotation of the handle 115 and associated components of the vise handle 1 in the counterclockwise direction serves to loosen the jaws of the vise without any present limitation (short of the strength of materials) to the forces applied.

In accordance with the preceding explanation, variations and adaptations of the vise handle in accordance with the present invention will suggest themselves to a practitioner of the mechanical arts. For example, the spring washers need not be of the Belleville type, but could simply be bowed, or slotted, or possessed of frictional surfaces.

In accordance with these and other possible variations and adaptations of the present invention, the scope of the invention should be determined in accordance with the following claims, only, and not solely in accordance with that embodiment within which the invention has been taught.

What is claimed is:

1. A torque-limiting handle for a machinist's vise comprising:

a drive clutch having a distal side for engaging a machinist's vise and a proximal side having and presenting a plurality of circumferential teeth with ramp surfaces;

a shaft affixed to the drive clutch and extending distally therefrom;

a pressure clutch, located about the shaft, having and presenting at a distal side a complimentary plurality of circumferential teeth suitable to engage the ramp surfaces of the plurality of teeth of the drive clutch;

forcing means controllable for forcing along the shaft the pressure clutch into the drive clutch;

an adjustment mechanism for controlling the force with which the forcing means does force the pressure clutch into the drive clutch; and means for rotating the pressure clutch;

wherein drive torque applied to the pressure clutch by the means for rotating will produce a regular repeatable increase in angular displacement of the drive clutch until, a preset torque between the drive clutch and the pressure clutch as is determined by the adjustment mechanism being reached, the plurality of teeth of the drive clutch will ramp over and snap free of the teeth of the pressure clutch, and no further torquing of the drive clutch can be realized;

wherein a machinist's vise engaged by the drive clutch of the torque-limiting handle can be tightened to an extent that is determined by the adjustment mechanism, and no tighter.

2. A torque-limiting handle for a machinist's vise comprising:

a drive clutch having a distal side for engaging a machinist's vise and a proximal side having and presenting a plurality of circumferential teeth with ramp surfaces;

a shaft affixed to the drive clutch and extending distally therefrom;

a pressure clutch, located about the shaft, having and presenting at a distal side a complimentary plurality of circumferential teeth suitable to engage the ramp surfaces of the plurality of teeth of the drive clutch;

forcing means for forcing along the shaft the pressure clutch into the drive clutch at a predetermined pressure, the forcing means including a plurality of spring washers affixed about the shaft at the proximal end thereof, pressuring against a main body fitting circumferentially about the shaft, in predetermined extension from an adjustment body fitting circumferentially about the shaft abutting against the pressure clutch, wherein adjustment of the predetermined extension of the main body from the adjustment body, and vice versa, determines how strongly the pressure force of the plurality of spring washers is transmitted to the pressure clutch, forcing the pressure clutch into the drive clutch at the predetermined pressure; and means for rotating the pressure clutch;

wherein drive torque applied to the pressure clutch by the means for rotating will produce a regular repeatable increase in angular displacement of the drive clutch until, a preset torque being reached, the plurality of teeth of the drive clutch will ramp over and snap free of the teeth of the pressure clutch, and no further torquing of the drive clutch can be realized;

wherein a machinist's vise engaged by the drive clutch of the torque-limiting handle can be tightened to a predetermined extent, and no tighter.

3. The handle according to claim 2 wherein the main body screws to predetermined extension from the adjustment body.

4. The handle according to claim 3 wherein the main body so screws under force provided by a human hand and fingers.

5. The handle according to claim 3 wherein the forcing means further comprises:
 detentes between the main body and the adjustment body for holding a variably selected screwed separation therebetween.

6. The handle according to claim 2 wherein the forcing means further comprises:
 detentes between the main body and the adjustment body for holding a variably selected separation therebetween.

7. The handle according to claim 2 wherein the means for rotating the pressure clutch comprises:
 a handle mount rotationally linked to the pressure clutch; and
 a hand handle, graspable by a human hand, affixable to the handle mount for imparting rotation thereto.

8. The handle according to claim 7 wherein the hand handle is pivotally affixed to the handle mount.

9. A mechanism for engaging the vise shaft of a vise to impart a predetermined torque to the shaft so as to develop a correspondingly predetermined force between jaws of the vise, the torquing mechanism comprising:
 a drive clutch having a distal end coupling that engages to the vise shaft of a vise and a proximal end multiple tooth inclined plane;
 a drive shaft affixed to the drive clutch and extending proximally therefrom;
 a pressure clutch, fitted about the shaft, having a distal end multiple tooth inclined plane complimentary to, and mating with, the multiple tooth inclined plane of the drive clutch so that
  a given rotational torque in a one rotational direction applied to the pressure clutch about the shaft will, in accordance with the extent to which the distal end of the pressure clutch is held pressured to the proximal end of the drive clutch, produce a correspondingly associated angular rotation of the drive clutch as serves to tighten the vise for a range of applied torques and associated angular rotations until, at a preset torque and a corresponding maximum angular rotation of the drive clutch and a corresponding maximum tightening of the vise, the pressure clutch will thereafter slip relative to the drive clutch, while
  rotational torque in an opposite rotational direction applied to the pressure clutch will produce a correspondingly associated angular rotation of the drive clutch as serves to open the vise;
 an adjustment mechanism, located proximally of the pressure clutch about the drive shaft and rotatably affixed to the pressure clutch,
  forcing at an adjustably determined force the pressure clutch into pressured contact with the drive clutch; and
 a handle, connected to the adjustment mechanism, for imparting rotation and torque to the pressure clutch so that rotation and torque will be transmitted from the pressure clutch to the drive clutch in accordance with the adjustably pressured contact between the pressure clutch and the drive clutch as is controlled by the adjustment mechanism;
  wherein the handle will produce rotation and torquing of the drive clutch until, an adjustably preset torque being reached, the drive clutch will thereafter slip relative to the pressure clutch, and no further torquing of the pressure clutch can be realized.

10. A mechanism for engaging the vise shaft of a vise to impart a predetermined torque to the shaft so as to develop a correspondingly predetermined force between jaws of the vise, the torquing mechanism comprising:
 a drive clutch having a distal end coupling that engages to the vise shaft of a vise and a proximal end multiple tooth inclined plane;
 a drive shaft affixed to the drive clutch and extending proximally therefrom;
 a pressure clutch, fitted about the shaft, having a distal end multiple tooth inclined plane complimentary to, and mating with, the multiple tooth inclined plane of the drive clutch so that
  a given rotational torque in a one rotational direction applied to the pressure clutch about the shaft will, in accordance with the extent to which the distal end of the pressure clutch is held pressured to the proximal end of the drive clutch, produce a correspondingly associated angular rotation of the drive clutch as serves to tighten the vise for a range of applied torques and associated angular rotations until, at a preset torque and a corresponding maximum angular rotation of the drive clutch and a corresponding maximum tightening of the vise, the pressure clutch will thereafter slip relative to the drive clutch, while
  rotational torque in an opposite rotational direction applied to the pressure clutch will produce a correspondingly associated angular rotation of the drive clutch as serves to open the vise;
 an adjustment mechanism, located proximally of the pressure clutch about the drive shaft and rotatably affixed to the pressure clutch, forcing at an adjustably predetermined force the pressure clutch into pressured contact with the drive clutch, the adjustment mechanism including
  a generally cylindrical adjustment body, centered about the shaft, with
   a distal end of the adjustment body against a proximal end of the pressure clutch, and
   proximal end internal screw threads,
  a generally cylindrical main body, centered about the shaft proximally of the adjustment body, with
   an extension through the adjustment body to rotationally engage the pressure clutch,
   a distal end shoulder against a proximal end of the adjustment body,
   distal end external screw threads threadingly engaging the screw threads of the adjustment body, and
   a proximal end region of the adjustment body connecting to a handle,
  a plurality of spring washers, arrayed centered about the shaft distally of the main body, and
  a stop at the proximal end of the shaft for holding the plurality of spring washers upon the shaft,
   wherein threading engagement of the adjustment body and the main body to a variable extent variably compresses the spring washers, transmitting the variable compression force thereof along the axis of the shaft to the pressure clutch, forcing the pressure clutch into variable compression with the drive clutch; and
   a handle, connected to the adjustment mechanism, for imparting rotation and torque to the pressure clutch so that rotation and torque will be transmitted from the pressure clutch to the drive clutch in accordance with the pressured contact between the pressure clutch and the drive clutch created by the adjustment mechanism;
    wherein the handle will produce rotation and torquing of the drive clutch until, a preset torque being reached, the drive clutch will thereafter slip relative to the pressure clutch, and no further torquing of the pressure clutch can be realized.

11. The torquing mechanism according to claim 10 wherein the adjustment mechanism further comprises:

detents between the adjustment body and the main body tending to hold both bodies at a manually preset rotation angle of threading engagement one body relative to the other, which manually present rotation angle determines the variable compression of the spring washers which, as transmitted along the axis of the shaft to the pressure clutch, forces the pressure clutch into variable compression with the drive clutch.

* * * * *